US010323158B2

(12) United States Patent
Mesnager et al.

(10) Patent No.: US 10,323,158 B2
(45) Date of Patent: Jun. 18, 2019

(54) COATING SLIPS BASED ON PARTIALLY SOLUBLE DEXTRINS OF HIGH MOLECULAR WEIGHT

(71) Applicant: ROQUETTE FRERES, Lestrem (FR)

(72) Inventors: Julien Mesnager, Toulon (FR); Vincent Wiatz, Lomme (FR); Patrick Dauchy, La Couture (FR); Ludivine Onic, Beuvry (FR)

(73) Assignee: Roquettes Freres, Lestrem (FR)

( * ) Notice: Subject to any disclaimer, the term of this patent is extended or adjusted under 35 U.S.C. 154(b) by 0 days.

(21) Appl. No.: 14/358,737

(22) PCT Filed: Nov. 16, 2012

(86) PCT No.: PCT/FR2012/052651
§ 371 (c)(1),
(2) Date: May 16, 2014

(87) PCT Pub. No.: WO2013/072639
PCT Pub. Date: May 23, 2015

(65) Prior Publication Data
US 2014/0329104 A1    Nov. 6, 2014

(30) Foreign Application Priority Data

| Nov. 18, 2011 | (FR) | 11 60559 |
| Nov. 18, 2011 | (FR) | 11 60560 |
| May 16, 2012 | (FR) | 12 54539 |
| May 16, 2012 | (FR) | 12 54540 |

(51) Int. Cl.

| C09D 103/02 | (2006.01) |
| D21H 17/28 | (2006.01) |
| D21H 19/54 | (2006.01) |
| C08B 30/14 | (2006.01) |
| C08B 30/18 | (2006.01) |
| C09J 103/02 | (2006.01) |
| C08L 3/02 | (2006.01) |

(52) U.S. Cl.
CPC ............ *C09D 103/02* (2013.01); *C08B 30/14* (2013.01); *C08B 30/18* (2013.01); *C08L 3/02* (2013.01); *C09J 103/02* (2013.01); *D21H 17/28* (2013.01); *D21H 19/54* (2013.01); *Y10T 428/31993* (2015.04)

(58) Field of Classification Search
None
See application file for complete search history.

(56) References Cited

U.S. PATENT DOCUMENTS

| 2,818,357 A | 12/1957 | Ziegler et al. |
| 3,682,733 A * | 8/1972 | Smit .................... C08B 31/125 106/207.1 |
| 5,472,732 A | 12/1995 | Ohkuma et al. |
| 5,620,873 A | 4/1997 | Ohkuma et al. |
| 6,191,116 B1 | 2/2001 | Kasica et al. |
| 6,613,152 B1 | 9/2003 | Maas et al. |
| 6,709,526 B1 * | 3/2004 | Bailey .................... A61L 15/28 127/29 |
| 7,759,316 B2 | 7/2010 | Kitamura et al. |
| 8,216,381 B2 | 7/2012 | Ladret et al. |
| 8,916,628 B2 | 12/2014 | Mentink et al. |
| 2002/0142031 A1 * | 10/2002 | Gilleland .................. C08L 3/04 424/451 |
| 2004/0112559 A1 | 6/2004 | Du Bourg et al. |
| 2006/0225855 A1 | 10/2006 | Ladret et al. |
| 2007/0289486 A1 * | 12/2007 | Apostol ................. C09D 11/08 106/31.39 |
| 2008/0206571 A1 | 8/2008 | Berckmans et al. |
| 2010/0058953 A1 | 3/2010 | Ladret et al. |
| 2010/0159263 A1 * | 6/2010 | Ahlgren ................. D21H 19/58 428/514 |
| 2010/0183890 A1 | 7/2010 | Wicher |
| 2011/0229731 A1 * | 9/2011 | Evstatieva ............ C08F 251/00 428/514 |
| 2014/0326166 A1 | 11/2014 | Mesnager et al. |

FOREIGN PATENT DOCUMENTS

| CN | 101395320 | 3/2009 |
| CN | 101903596 A | 12/2010 |
| CN | 101932648 A | 12/2010 |
| EP | 0207676 A2 | 1/1987 |
| EP | 0 368 451 | 5/1990 |
| EP | 0470871 A1 | 2/1992 |
| EP | 0 538 146 | 4/1993 |
| EP | 710 670 | 5/1996 |
| EP | 1 964 969 | 9/2008 |
| FR | 2 291 788 | 6/1976 |
| FR | 2 855 840 | 12/2004 |
| FR | 2 909 392 | 6/2008 |

(Continued)

OTHER PUBLICATIONS

International Search Report dated Apr. 24, 2013, corresponding to PCT/FR2012/052651.
S. Perez; Initiation a la Chimie et a la Physico-Chimie Macromoleculaires; 2000; vol. 13; Chapter II; "Structure Et Morphologie Du Grain D'Amidon".
Chinese Office Action issued in Application No. 2012800562845, dated Jan. 29, 2016.
The English translation of the Japanese Office Action, dated Sep. 28, 2016, in the related Japanese Appl. No. 2014-541739.

*Primary Examiner* — Chinessa T. Golden

(57) ABSTRACT

A coating slip includes water, at least one pigment and at least one modified starch, exhibiting: a weight-average molecular weight ranging from 250 000 to 2 000 000 Da; and a solubility, measured according to a test A, ranging from 50 to 85%. A process for the preparation of the slip, and a process for coating paper using this slip are also described.

16 Claims, No Drawings

(56) References Cited

FOREIGN PATENT DOCUMENTS

| | | |
|---|---|---|
| JP | 2002187779 A | 7/2002 |
| JP | 2005226182 A | 8/2005 |
| JP | 2005264392 A | 9/2005 |
| JP | 2007270369 A | 10/2007 |
| JP | 2010047713 A | 3/2010 |
| JP | 2010053281 A | 3/2010 |
| JP | 2011057722 A | 3/2011 |
| JP | 2011195809 A | 10/2011 |
| WO | 2005/003456 | 1/2005 |
| WO | 2008/074957 | 6/2008 |
| WO | 2008/104574 | 9/2008 |
| WO | 2009022195 A1 | 2/2009 |
| WO | 2009/080376 | 7/2009 |
| WO | WO 2009080376 A1 * | 7/2009 |

* cited by examiner

COATING SLIPS BASED ON PARTIALLY SOLUBLE DEXTRINS OF HIGH MOLECULAR WEIGHT

A subject-matter of the invention is novel coating compositions useful in the manufacture of coated paper comprising a novel modified starch of precise molecular weight and precise solubility. The invention also relates to a process for the manufacture of coated paper from this novel composition and to the coated paper thus obtained.

In the paper and board industry, numerous different grades of products exist. Paper and board of high quality, for example those used in magazines or information leaflets, are generally coated papers or boards, combined together under the term "coated papers" in the present patent application.

A coated paper is a paper, the surface of which is covered with one or more "layers", generally based on pigments mixed with binders and various additional products.

These layers are applied by a coating process which is carried out using aqueous compositions known as "coating colours". The aim of this operation is to render the surface of the paper, which is rough and macroporous in the absence of treatment, even and microporous, in order to make possible better reproduction of the printings.

Furthermore, it is possible, by this operation, to improve the whiteness, the gloss or the feel of the printed paper.

Coated paper also has to exhibit a good wet pick resistance, which can be determined by an IGT (Institut voor Graphisce Technieck) device. This property is very important in the field of coated paper as it makes it possible to obtain a good printing quality, in particular in the case of offset printing. This is because, during the printing process, successive applications of different coloured greasy inks are carried out on the paper. In order to have well defined printing, inking rollers, which act as mould, are covered with regions of greasy ink and with regions of wetting water, which is a an aqueous-based composition, these wetting water regions preventing the greasy ink from printing the paper in the regions where it must not be printed. The presence of water on the roller thus makes it possible to delimit the regions to be printed. This water will thus moisten the paper during the printing process. The ink is then applied to a slightly wet paper and it is necessary for the layer to be resistant to this moisture, for quality printing.

In order to produce the coated paper, one or more fine layers of coating compositions is/are thus applied and is/are dried on the paper. This composition is applied by continuous coating on a paper, generally by film press or blade coating techniques.

The thickness of the layer can be regulated by adjusting the pressure and the speed of forward progression of the paper.

This coated paper or board can subsequently be used in printing processes, for example, of offset, photogravure, rotogravure, lithogravure, inkjet or flexography type.

In the coating colour, the binders have the role of causing the pigments to stick to one another in the layer obtained and of causing the layer to adhere to the paper. This layer is obtained after drying said colour during the process of coating the paper.

The amounts of pigments in the colour are generally very high (generally greater than 50% of the solids content of the colour). Furthermore, this colour generally comprises relatively limited amounts of water, generally less than 60%, even less than 50%, by total weight of the coating colour. This is because, as the layer is obtained by drying the colour applied during the coating process, it is advantageous for the amount of water in the colour to be low in order to be able to rapidly obtain the coated paper by evaporation of the water and to use little energy in removing this water.

At the same time, it is also necessary for the viscosity of the coating colour not to be excessively high, despite the small amount of water included in the colour. This makes it possible to easily apply the colour: if the latter is not fluid enough, it is necessary to slow down the coating process in order to obtain a layer having the desired thickness.

The binders generally used in the colours are styrene polymers, for example of styrene-butadiene or styrene-acrylate type, which are used in the form of dispersions in water, otherwise known as "latexes". These latexes are fluid, which makes it possible to manufacture colours having a rheological behaviour particularly suitable for the process of paper coating.

Furthermore, the properties of the paper obtained are excellent, which is explained by an excellent adhesion of the fillers to one another and by very good bonding of the layer to the paper.

The printability and the strength of the coated paper obtained are furthermore excellent.

However, these dispersions can be relatively unstable depending on the storage conditions. This storage cannot be carried out in dry form, which involves, due to the presence of water, additional transportation costs. Furthermore, they are produced from non-renewable petroleum resources. These dispersions can thus be relatively expensive. Finally, the coating colours comprising solely conventional styrene dispersions as binder exhibit a poor water retention, that is to say that water has to be continually added to the colour during the coating process in order for this colour to retain its initial viscosity and for the machineability of the colour to be maintained during the process.

Thus, it has been proposed for some years to replace these dispersions, in full or in part, with products of renewable origins. These products can be modified starches, which have to be at least partially dissolved in the colour in order to be able to contribute the role of binder.

The modified starches can be prepared by various types of conversions, for example chemically or enzymatically.

Schematically, it is generally considered that, in order to increase the solubility of a starch, it is necessary to reduce the molecular weight thereof.

Thus, if these modified starches exhibit a high molecular weight, the latter is combined with a low solubility in water. Mention may be made, by way of example, of the modified starch Stabilys® A023, which is a dextrin sold by the Applicant Company, which exhibits a weight-average molecular weight of approximately 300 000 Da and a solubility in water of approximately 5%. In contrast, these modified starches can also be highly soluble derivatives exhibiting a low molecular weight. This is the case with the dextrin Stabilys® A046, also sold by the Applicant Company, which exhibits a weight-average molecular weight of approximately 25 000 Da and a solubility in water of approximately 90%.

Mention may be made, as an example of a coating colour comprising a modified starch, of the document WO 2005/003456 A1 owned by the Applicant, which describes an intermediate composition of a specific modified leguminous starch which can be used in coating colours.

However, these intermediate compositions exhibit the disadvantage of having a viscosity which increases strongly with the amount of starch. Although it is possible to use them, this presents the problem of relatively high viscosity of the colour finally obtained. The result of this is that the process has to be greatly slowed down, in comparison with a process using styrene polymer dispersions, in order to be able to carry out the coating of the paper.

The document WO 2008/074957 describes the use of modified starch in the manufacture of coating colours exhibiting a high molecular weight and a specific sol/gel transition temperature. These modified starches are slightly soluble at room temperature. They are subjected to a step of cooking in a Jet-Cooker in aqueous solution before being used in the manufacture of the coating colour. The result of this is an aqueous composition having a relatively high solids content, which is used to manufacture the coating composition, this composition being more fluid than those prepared from conventional modified starches. The properties of the coated paper obtained are quite satisfactory.

However, even if the problems of high viscosity and of dry weight of the coating composition are partially solved, it still remains necessary to improve them.

The document EP 1 964 969 A1 describes, for its part, a coating colour which comprises a starch of precise molecular weight and precise solubilities which exhibits a granular structure. This starch makes it possible to reduce the cost of the coating compositions, in comparison with the compositions comprising other cold-soluble starches, while making it possible to increase the dry weight of the coating compositions.

However, this coating colour is unsatisfactory, particularly in terms of wet pick resistance.

It is to the credit of the Applicant to have been able to manufacture novel coating colours from novel modified starches, which exhibit properties improved with respect to those of the prior art.

SUMMARY OF THE INVENTION

A subject-matter of the invention is thus a coating colour comprising water, at least one pigment and at least one modified starch, said modified starch exhibiting:
- a weight-average molecular weight ranging from 250 000 to 2 000 000 Da;
- a solubility, measured according to a test A, ranging from 50 to 85%.

The modified starches included in the coating colour of the invention exhibit the advantage of combining a relatively high solubility in water and a relatively high molecular weight. Thanks to the combination of these a priori contradictory properties, these colours can advantageously be used in the coating field. This is because, in addition to fulfilling the requirements already presented, the colours according to the invention have the advantage of making it possible to obtain a coating process of high machineability, in comparison with the processes using the slips already known. The coated paper obtained exhibits the advantage of exhibiting good properties and in particular an excellent wet pick resistance.

DETAILED DESCRIPTION

The modified starch useful in the invention thus exhibits specific characteristics of molecular weight and aqueous solubility.

As regards the molecular weight (W) of the modified starch, it is expressed in Da and can be determined by a person skilled in the art using size-exclusion chromatography of HPSEC-MALLS (High Performance Size Exclusion Chromatography coupled on-line with Multiple Angle Laser Light Scattering) type.

This weight can be measured by size-exclusion chromatography according to the following protocol:
- preparation of a sample by dissolution of the modified starch, by heating at 100° C. for 30 min in a dilution solvent composed of a DMSO/NaNO$_3$ mixture (0.1M NaNO$_3$ in DMSO), it being possible for said sample to exhibit a concentration ranging from 2 to 10 mg of starch per ml of dilution solvent;
- use of a high performance liquid chromatography (HPLC) device equipped with a pump, operating in isocratic mode, which causes an elution solvent to circulate at 0.3 ml/min, with a refractometer, with a laser multiple angle light scattering detector having 18 angles which is heated at 35° C., for example a DAWN DSP detector from Wyatt, and with an oven for thermostatic control of the columns heated at 35° C., for example equipped with polyhydroxymethacrylate columns of Suprema type for which the elution solvent is, for example, a 0.1M aqueous sodium nitrate solution comprising 0.02% by weight of sodium azide;
- injection into the device of approximately 100 µl of the sample.

The weight-average and number-average molecular weights can be determined from the spectra obtained, for example by reprocessing the spectra as exponential $1^{st}$ order, using analytical software of Astra v.4 type.

For its part, the solubility is measured according to the test A, which consists of the following method:
- taking a weight of test sample (w test sample) of approximately 5.0 g of modified starch, this weight being expressed as dry weight;
- dispersing in 200 ml of water at 22° C. in an Erlenmeyer flask, which is subsequently placed at 22° C. in a water bath for 4 hours under magnetic stirring with stirring for 5 minutes every 30 minutes;
- filtering the contents of the flask through a filter with a porosity of 8 µm, for example of Whattamn 2 V type;
- pipetting 50 ml of filtrate and introducing this amount into a dry and tared crystallizing dish;
- evaporating the water from the crystallizing dish by heating at 60° C. for 45 minutes and then at 130° C. for 90 minutes;
- after cooling in a desiccator, weighing the weight of starch obtained after drying (w solids extract).

The solubility is calculated in the following way:

$$\text{Solubility} = [w \text{ solids extract} \times 200 \times 100]/[50 \times w \text{ test sample}]$$

The dry weight of the test sample is calculated according to Standard ISO 1666:1996.

The modified starch useful in the invention advantageously exhibits a polydispersity index of greater than 5, preferably of greater than 10 and more preferably still of greater than 15.

The modified starch according to the invention can exhibit a number-average molecular weight of greater than 20 000 Da, preferably of greater than 25 000 Da and more preferably still of greater than 30 000 Da.

Preferably, the solubility of the modified starch ranges from 55 to 65%.

Preferably, the modified starch exhibits a weight-average molecular weight ranging from 380 000 Da to 1 400 000 Da.

The modified starch useful in the invention can exhibit a mass fraction of greater than 5% of starch molecules with a molecular weight of greater than 1 000 000 Da, preferably a fraction of between 5 and 25%.

Preferably, the modified starch comprises, with respect to the total weight of modified starch:
- a mass fraction of between 5 and 25% of starch molecules with a molecular weight of greater than 1 000 000 Da,
- a mass fraction of between 25 and 50% of starch molecules with a molecular weight of greater than 100 000 Da and less than or equal to 1 000 000 Da,
- a mass fraction of between 30 and 50% of starch molecules with a molecular weight of greater than 10 000 Da and less than or equal to 100 000 Da,
- a mass fraction of less than 20% of starch molecules with a molecular weight of less than or equal to 10 000 Da.

The modified starch useful in the invention can be a dextrin, that is to say that it can be obtained by a dextrinization step.

Numerous processes for modifying starch and in particular dextrinization processes have been developed, these processes using the action of heat, in a dry or non-dry medium, in the presence or absence of chemical agent. For the most part, whether batchwise or continuous, these processes involve transformation temperatures of greater than 100° C. and the optional presence of an acid, of an alkaline agent and/or of an oxidizing agent.

Dextrins are generally classified into three categories:
- white dextrins, generally obtained by transformation of the starch at temperatures often of between 120 and 170° C., in the presence of chemical agent(s), in particular of acid, in relatively high amounts,
- yellow dextrins, often manufactured by transformation of the starch at higher temperatures, generally between 170 and 230° C., in the presence of chemical agent(s), in particular of acid,
- dextrins known as "British Gum", obtained by the action of heat alone, at high temperature, often of greater than 230° C.

The dextrinization processes generate different reactions. The importance of each of them varies with the essential parameters, such as the nature and the amount of chemical agent, the water content during reaction, the temperature profile and, to a lesser extent, the reaction time.

A person skilled in the art generally considers that various mechanisms can occur during the reaction for the dextrinization of starch.

The hydrolysis reaction is significant at the start of the transformation, this being the case from 50° C. Related to the presence of acid and of a still-sufficient quantity of water, it reduces the molecular weight.

The condensation or reversion reaction forms an $\alpha(1.6)$ bond from a primary alcohol of one chain and the reducing end of another chain. It is promoted by temperatures of less than or close to 150° C.

The "transglucosidation" reaction, forming an $\alpha(1.6)$ bond while cleaving an $\alpha(1.4)$ bond without releasing water, is predominant at temperatures of greater than 150° C. As it makes it possible to obtain more branched molecules, it is essential to the expression of the properties of the dextrins, in particular yellow dextrins.

Other reactions also take place, such as internal "anhydridization", between carbons 1 and 6, or the recombination resulting from the reaction between a reducing end and a $C_2$, $C_3$ or $C_4$ hydroxyl group.

The relative importance of these phenomena confers specific properties on the dextrins.

In the transformation of white dextrins, the predominant mechanism is hydrolysis. The result is that these white dextrins exhibit high molecular weight with low solubility in water, or the contrary. In the case of yellow dextrins, hydrolysis is important and all the mechanisms described above have an equal importance, which results in products of low molecular weight, generally rebranched, exhibiting a high solubility in water.

The properties of the dextrins thus result from the competition of the various complex reaction mechanisms described above. The Applicant has succeeded, thanks to a process using specific operating conditions, in manufacturing, from starch, a modified starch exhibiting properties which are a priori contradictory, i.e. exhibiting a high solubility in water but also a high molecular weight. Without being committed to any one theory, the Applicant explains that this modified starch is obtained by the choice of conditions which make it possible to promote, more preferably than usual, rebranching or recombination reactions, which increase the molecular weight, while limiting cleavage reactions, which reduce the molecular weight (hydrolysis reactions). The relative proportions of these reactions and mechanisms, occurring under very specific conditions, result in macromolecular structures of high weight exhibiting a high solubility in water.

The Applicant has succeeded in obtaining this modified starch by carrying out the reaction on a starch of granular form using specific conditions.

In the present case, in order to obtain the modified starch useful in the invention, which is a dextrin, the Applicant has developed a process for modifying starch, which comprises:
- a step of introducing at least one granular starch into a reactor;
- a step of introducing, into said reactor, at least one acidic agent chosen from among strong acids;
- a step of modifying the starch in said reactor;
- a step of recovering the starch modified during the preceding step;

in which at least part of the modifying step is carried out with:
- a moisture content of the starch of between 1 and 3%;
- an amount of acid introduced of between 0.003 and 0.020 mol of acid per kg of dry starch, preferably between 0.006 and 0.015 mol and more preferably between 0.008 and 0.012 mol;
- and a temperature of the reactor of between 160 and 215° C., preferably between 170 and 210° C.

At the end of the process, a modified starch is recovered which exhibits the molecular weight and the solubility defined above. The structure of the modified starch obtained is generally granular.

The duration of the modifying step, subsequently referred to as "contact time", is advantageously between 1 and 10 minutes, preferably between 3 and 7 minutes.

The period of time during which the modifying takes place at a moisture content of between 1 and 3% is at least 10 seconds, preferably at least 30 seconds and more preferably still at least 1 minute.

Throughout the step of modifying the starch, it is preferable for the content of the starch never to be less than 1%.

Various processes for modifying starch carried out in the dry phase, under hot conditions and in the presence of acid, have already been described in the prior art.

For example, according to the document EP 710 670 A1, use is made of a process in which a maize starch is introduced with an amount by weight of hydrochloric acid of 0.63% with respect to the weight of the starch, i.e. a molar amount of approximately 0.14 mol per kg of starch. The temperature during the process is at most 120° C. and the moisture content at the end of the process is approximately 11%. A starch with a low weight-average molecular weight, far below 250 000 Da, is obtained.

Mention may also be made of U.S. Pat. No. 6,191,116 B1, which describes a completely soluble dextrin manufactured by a process in which an anhydrous starch is modified at a temperature ranging from 170 to 210° C. with an amount by weight of acid, preferably hydrochloric acid, of 0.25% with respect to the weight of the starch, that is to say a molar amount of approximately 0.07 mol per kg of starch.

These processes of the prior art have not made it possible to obtain the modified starch of the invention.

The starch introduced during the process of the invention is in a granular form.

Within the meaning of the present invention, "granular starch" is understood to mean a native starch or a modified starch which has retained a semicrystalline structure similar to that demonstrated in the starch grains naturally present in the storage organs and tissues of higher plants, in particular in cereal seeds, legume seeds, potato or cassava tubers, roots, bulbs, stems and fruits.

This semicrystalline state is essentially due to the amylopectin macromolecules, one of the two main constituents of starch. In the native state, starch grains exhibit a degree of crystallinity which varies from 15 to 45% and which depends essentially on the botanical origin of the starch and on the possible treatment to which it has been subjected. Granular starch, placed under polarized light, exhibits microscopically a characteristic black cross, referred to as "Maltese cross", typical of the crystalline granular state. For a more detailed description of granular starch, reference may be made in particular to chapter II, entitled "Structure et morphologie du grain d'amidon" [Structure and morphology of the starch grain] by S. Perez in the work "Initiation á la chimie et á la physico-chimie macromoleculaires" [Introduction to macromolecular chemistry and physical chemistry], first edition, 2000, Volume 13, pages 41 to 86, Groupe Francais d'Etudes et d'Applications des Polymeres.

A starch granule comprises amylose, amylopectin and water. The moisture content of granular starch, under standard conditions, varies according to the botanical nature of the starch. This is because granular starch comprises an intrinsic amount of water and the moisture content in this starch is generally between 10 and 20%. By way of examples, a maize starch exhibits a moisture content under standard conditions of approximately 13%, while a potato flour exhibits a moisture content of approximately 18%. Thus, when 1% of water is added to a maize starch, a starch exhibiting a moisture content of approximately 14% is obtained.

According to the process for modifying the starch useful in the invention, at least part of the step of modifying the starch is carried out with a low moisture content in the starch, for example of between 1 and 3%. It is specified that the moisture content of the starch consists of the water/dry starch ratio by weight and that it can be measured according to Standard ISO 1666:1996.

The modifying step is carried out using an acidic agent chosen from strong acids. The step of introducing the acidic agent of use in the modifying step can be carried out using an aqueous acidic solution. The amount of acidic solution thus introduced into the reactor is low, advantageously between 0 and 10% of the weight of dry starch, preferably between 0.5 and 4%.

A person skilled in the art understands, by strong acid, an acid exhibiting a pKa<−1.7. This acidic agent can be chosen in particular from methanesulphonic acid, sulphuric acid, hydrochloric acid or nitric acid, or one of their mixtures.

Advantageously, the acidic agent is methanesulphonic acid, sulphuric acid, hydrochloric acid, or a mixture of at least two of these acids, preferably sulphuric acid. In the process according to the invention, the amount of acidic agent is between 0.003 and 0.020 mol of acid per 1 kg of dry starch, which is equivalent, in the case of hydrochloric acid, to amounts by weight of acid, with respect to the starch, within amounts ranging approximately from 0.01 to 0.08% (dry/dry) and, in the case of sulphuric acid or methanesulphonic acid, to amounts by weight of acid, with respect to the starch, within amounts ranging approximately from 0.03 to 0.2% (dry/dry).

The step of introducing the acidic agent into the reactor can be carried out simultaneously with the step of introducing the starch, for example by introducing a mixture of starch and acid. Said mixture can be produced before they are introduced into the reactor by simple mechanical mixing. An example of a mixer which can be used to this end is the CB 20 sold by Lödige®. Generally, the acid is introduced into the reactor in the form of an aqueous acidic solution.

The total amount of water of the starch is composed of the amount of water intrinsically present in the starch and of the amount of water optionally added to this starch in the reactor. The moisture content of the starch during the process is the ratio by weight of the total amount of water to the sum of the total amount of water and anhydrous starch. It is advantageous for the moisture content of the starch at the beginning of the reaction not to exceed 35%, for it to be preferably less than 25%, more preferably still less than 18% and even less than 16%.

The process for modifying the starch useful in the invention can be carried out in any type of reactor, for example a batch reactor or a continuous tubular reactor.

Preferably, the modifying step is carried out in the cylindrical linear turboreactor described above which is well known to a person skilled in the art. Such a type of reactor is sold, for example, by Vomm® and is described in detail in the document EP 710 670 A1.

The turboreactor comprises a rotating shaft provided with blades, the function of which is to continuously convey the starch. The starch is introduced at the head of the turboreactor and is then conveyed through the reactor using the blades.

The contact time can be chosen by modifying the rotational speed of the shaft. It is also possible to increase these times by carrying out at least two passes of the starch through the turboreactor.

In order to carry out the modifying step, it is necessary to remove a portion of the water from the starch since, as explained above, under standard conditions, the moisture content of granular starch is between 10 and 20%. It is thus possible to carry out a step of preliminary drying of the starch before carrying out the modifying step itself.

Use may be made of any dryer known to a person skilled in the art in order to carry out this drying step, for example an oven, a fluidized bed or a dryer of "turbodryer" type. A turbodryer is produced in a turboreactor by bringing about the circulation in said turboreactor of a stream of air, referred to in the continuation of the description as "drying stream". This turbodryer is also described in detail in the abovementioned document EP 710 670 A1.

The air of the drying stream preferably has a temperature of between 50 and 250° C., preferably between 150 and 220° C. The air flow rate of the stream can also be varied. The drying stream can be chosen to circulate in the direction of conveyance of the starch or in the opposite direction. Preferably, the air stream travels in the direction of conveyance.

The drying stream can have a flow rate of between 10 and 1000 Sm³/h, for example from 30 to 500 Sm³/h. The conditions of the drying stream set out above are, however, chosen in order for the moisture content in the starch to be between 1 and 3% during at least part of the modifying step.

Advantageously, the reactor is a turboreactor and the drying and the modifying of the starch are carried out simultaneously by use of a drying stream.

The step of introducing the acidic agent into the turboreactor can be carried out simultaneously with the step of introducing the starch, for example by introducing a mixture of starch and acid. Said mixing can be carried out before their introduction into the turboreactor by simple mechanical mixing. An example of a mechanical mixer which can be used to this end is the CB 20 sold by Lödige®.

Thus, very particularly, the process for modifying starch comprises:
- a step of mixing at least one granular starch with an aqueous solution comprising an acidic agent chosen from strong acids;
- a step of introducing the mixture formed during the preceding step into a turboreactor in the presence of a drying stream;
- a step of modifying the starch in said turboreactor;
- a step of recovering the modified starch obtained during the preceding step;

in which at least part of the modifying step is carried out with:
- a moisture content of the starch of between 1 and 3%;
- an amount of acid introduced of between 0.003 and 0.020 mol of acid per kg of dry starch, preferably between 0.006 and 0.015 mol, indeed even between 0.008 and 0.012 mol;
- and a temperature of the reactor of between 160 and 215° C., preferably between 170 and 210° C.;

the duration of the modifying step advantageously being between 1 and 10 minutes, preferably between 3 and 7 minutes, and the moisture content of the starch during the modifying step being greater than 1%.

At the end of the modifying process, the modified starch can be neutralized using a base, for example using sodium hydroxide or sodium carbonate.

Various processes for obtaining the modified starch useful in the invention appear in the examples.

The modified starch useful in the invention exhibits the advantage of being able to easily form, by simple mixing in water and in particular in water at room temperature, a solution capable of adhesively bonding to numerous supports, which will subsequently be referred to as aqueous binder.

The aqueous binder obtained from the modified starch of the invention exhibits the advantage of having a relatively low viscosity, even when the amount of starch in the binder is high.

Without being committed to any one theory, the Applicant explains these properties by the specific solubility and the molecular weight of the modified starch in accordance with the invention.

The aqueous binder can be an aqueous composition comprising, by weight, from 0.01 to 90% of modified starch according to the invention, for example from 1 to 25%.

The Applicant Company has found that these particularly advantageous properties make it possible to use this modified starch to manufacture a coating colour exhibiting excellent properties.

In addition to the modified starch, the coating colour additionally comprises water and one or more pigments.

The coating colour according to the invention can comprise, in addition to the water, optionally small amounts of at least one other solvent, such as an alcohol, but it is preferable for the solvent of the colour to be composed of water.

The coating colour advantageously exhibits a solids content of between 40 and 85%, preferably between 50 and 75% and more preferably still between 55 and 73%.

Examples of appropriate pigments comprise clays, such as kaolin, but also calcined clays, hydrated aluminium silicates, bentonite, calcium carbonate, calcium sulphate or gypsum, silicas, in particular precipitated silicas, titanium dioxide, alumina, aluminium trihydrate, plastic pigments, such as those made of polystyrene, satin white, talc, barium sulphate, zinc oxide and mixtures of two or more of them.

The appropriate pigment or pigments can be easily selected by a person skilled in the art according to the type of coating colour to be obtained. To prepare the coating colour according to the invention, the pigment can be added in the form of a dispersion of the pigment in water.

The coating colour according to the invention can also comprise one or more additional polymers having the role of binder, other than the modified starch of the invention. This additional polymer can be a polymer chosen from styrene polymers, for example a styrene/butadiene, styrene/acrylate or styrene/butadiene/acrylate copolymer, polymers of (meth)acrylic type or of (meth)acrylate type, saponified or nonsaponified polyvinyl acetates, starches other than the modified starch according to the invention, and protein binders, such as casein, gelatin or soya proteins. Preference is given, as additional polymer, to a polymer chosen from styrene polymers.

These additional polymers can advantageously be introduced into the composition via a dispersion in water.

The coating colour according to the invention can comprise, per 100 parts of pigments, from 1 to 100 parts of modified starch and from 0 to 20 parts of additional polymer, the sum of the parts of modified starch and additional polymer ranging from 3 to 100 parts.

Advantageously, the coating colour comprises, per 100 parts of pigments, from 1 to 25 parts of modified starch and from 0 to 10 parts of additional polymer, the sum of the parts of modified starch and additional polymer ranging from 4 to 30. Preferably, the coating colour comprises, per 100 parts of pigments, from 2 to 15 parts of modified starch and from 2 to 7 part of additional polymer, the sum of the parts of modified starch and additional polymer ranging from 6 to 25 parts.

The coating colour generally comprises a pH regulator, for example a base, such as sodium hydroxide, or an acid, such as hydrochloric acid.

The pH of the colour, which generally ranges from 8 to 10.5 and preferably from 8.5 to 10, is adjusted by adding selected amounts of pH regulator.

The coating colour can also comprise additives conventionally used in coating colours.

Mention may be made, as additives, of thickeners. Examples of appropriate thickeners comprise synthetic thickeners or thickeners of natural origin, such as cellulose ethers, for example carboxymethylcellulose (CMC), hydroxyethylcellulose, hydroxypropylcellulose, ethylhydroxyethylcellulose or methylcellulose, alginates, such as sodium alginate, xanthan gum, carrageenans and galactomannans, such as guar gum.

Other additives which can be used are surfactants, for example cationic surfactants, anionic, nonionic or amphoteric surfactants, and fluorinated surfactants.

Hardeners can also be used, such as, for example, active halogen compounds, vinyl sulphone compounds or epoxy compounds.

Dispersing agents, such as polyphosphates or polycarboxylates, can also be used.

Mention may be made, as examples of additives which can also be included in the coating colour of the invention, of agents which improve the fluidity, lubricants, antifoaming agents, optical brighteners, preservatives, such as, for example, benzisothiazolone and isothiazolone compounds, or biocidal agents, such as, for example, sodium metaborate, thiocyanate and benzoate.

Other additives which may be mentioned are also yellowing inhibitors, such as sodium sulphonate derivatives, ultraviolet absorbents or antioxidants.

Agents for resistance to water, which can be chosen from ketone resins, anionic latexes or glyoxal, and/or wet or dry strength agents, such as glyoxal-based resins, polyethylene oxides, or melamine or urea-formaldehyde resins, can also be used.

Crosslinking agents, additives for retaining the gloss of the ink or additives for resistance to greases and oil can also be included in the coating colour of the invention.

The person skilled in the art can select the additives in order to obtain the coating colour and the paper having the desired properties. The coating colour can comprise, per 100 parts of pigments, from 0 to 5 parts of additives.

The coating colour can be prepared by simple mixing of the various constituents of the composition: the invention thus relates to a process for manufacturing a coating colour comprising a step of mixing pigments, modified starch, water and optional additional polymer, in which the modified starch is introduced into the colour without having been subjected to a precooking step.

The invention thus also relates to a process for preparing a colour comprising:
  a step of mixing the water, the pigment, the modified starch according to the invention and the additional polymer, indeed even the optional additives;
  a step of recovering the coating colour;
in which the process is carried out at a temperature ranging from 5 to 50° C., preferably from 15 to 40° C.

Preferably, the pigment and the optional additional polymer are introduced in the form of dispersions in water, which makes it possible to facilitate the preparation of the colour. In particular, a coating colour can be manufactured as follows: a dispersion of pigments, water, optionally a dispersion of additional polymer and/or additives are mixed at a temperature ranging from 5 to 50° C., preferably from 15 to 40° C. and preferably at room temperature, and then the modified starch of the invention is added. After mixing, a coating colour is obtained which is capable of being used in a coating process.

A person skilled in the art can select the amounts of each of the constituents in order to have the viscosity which will make it possible to apply the composition to the paper in a satisfactory way during the coating process. For example, the coating colour according to the invention exhibits a Brookfield viscosity ranging from 500 to 2000 mPa·s, preferably between 600 and 1200 mPa·s, preferably between 600 and 900 mPa·s, and/or a Hercules viscosity ranging from 40 to 80 mPa·s. The Brookfield viscosity can be measured using a viscometer having the Brookfield trade name, the rotational speed of the spindle of which is 100 revolutions/minute. The Hercules viscosity can be measured using a viscometer having the Hercules trade name equipped with an "FF" bob, the rotational speed of which is 6000 revolutions/minute. The viscosity of the colour increases mainly with the solids content, the amount of pigments and the amounts of starch, additional polymer and thickener. As the coating colour according to the invention exhibits the advantage of being able to exhibit a lower viscosity than some starch-based coating colours of the prior art, this makes it possible to be able to use greater amounts of modified starch in the colour for an equivalent viscosity.

Another subject-matter of the invention is a process for coating paper, comprising at least one step of coating a paper with the coating colour according to the invention, preferably from 1 to 5 steps and more preferably still from 2 to 3 coating steps.

The coating process according to the invention exhibits the advantage of being able to use greater coating rates than some starch-based coating colours of the prior art, which makes it possible to increase the productive output of the paper coating processes.

According to the invention, the term paper encompasses any type of paper or board capable of being subjected to a coating treatment.

The coating of the paper can be carried out in line in the papermaking machine or on a separate coating machine.

Depending on the quality of the paper or board desired and its final use, it can be coated on just one or both of its faces. Each face of the paper can be coated just once or several times, on one or both of its faces, provided that at least one of the layers is produced from the coating colour according to the invention. By way of example, a coated paper of high quality generally comprises three layers per side.

To produce a layer, first of all a covering step is carried out, followed by a drying step.

The paper-covering step according to the invention can be carried out by any covering process known to a person skilled in the art. It can be carried out, for example, by air-knife coating, pencil coating, smooth rod coating, threaded rod coating, spray coating, knife coating, curtain coating, size press coating, film press coating, brush coating, cast coating, gravure coating, jet applicator coating, short dwell coating, slide hopper coating, flexographic coating and reverse roll coating.

After the covering step, the layer is obtained by a drying step. This drying step can be carried out by drying with air, by convection, by contact or by radiation, for example by infrared radiation.

Optionally, the coating process can comprise a calendering step, which makes it possible to increase the gloss and the smoothness of the coated paper.

The calendering step is generally carried out by passing the covered and dried paper through a calender or between rollers which are generally covered with elastomers. For better results, the calendering can be carried out with heated rollers.

Another subject-matter of the invention is a coated paper obtained from the coating process of the invention.

The paper of the invention exhibits better properties, in particular a wet strength which is superior to those of the coated papers obtained from starch-based coating colours of the prior art.

Each layer obtained by the process of the invention can comprise an amount of material ranging from 1 to 30 g/m$^2$, for example from 4 to 25 g/m$^2$ and preferably from 6 to 20 g/m$^2$.

The coated paper can comprise from 1 to 5 coating layers, preferably from 2 to 3 coating layers, at least one of which is obtained from the coating colour according to the invention.

The paper according to the invention exhibits an improved wet pick resistance with respect to that of the coated papers of the prior art, the layers of which are based on starch, it being possible for this resistance to be, according to the method described in the examples, greater than 60 m/s, advantageously greater than 75 m/s and preferably greater than 85 m/s.

Due to its superior properties, the coated paper according to the invention can advantageously be used in a printing process, such as, for example, printing of offset, heliogravure, rotogravure, lithogravure, ink jet or flexography type, preferably of offset type.

The present invention will now be illustrated in detail via examples which do not in any way limit the invention claimed.

Examples of the Manufacture of Starch

Use is made, as starting materials in the preparation of the modified starch useful in the invention, of a native maize starch, acid and water. The starch was modified using hydrochloric acid (HCl), sulphuric acid ($H_2SO_4$) or methanesulphonic acid ($CH_4O_3S$).

This modified starch is obtained by a dextrinization reaction according to the following protocol.

A premix of these three starting materials is prepared on a mixer of Lödige CB20 type by introducing maize starch, the relative moisture content of which is approximately 13%, one of the abovementioned acids and water. The moisture content of the premix thus formed and the number of moles of acid per kilogram of native starch are shown in Tables 1 and 2, which summarize the various tests carried out. They are respectively given in the columns entitled "% water" and "n".

The premix is subsequently introduced continuously at a flow rate by weight of 50 kg/h and conveyed through a cylindrical linear turbodryer sold by the manufacturer Vomm, exhibiting a rotating shaft provided with blades which rotates at a speed of 1000 revolutions/min. The temperature of the reactor is shown for the various tests in Tables 1 and 2. An airflow, having a temperature identical to that of the reactor, is introduced into the turboreactor and travels through this reactor in the direction of conveyance of the starch with a flow rate of 50 $Sm^3/h$, which makes it possible to dry the starch during the reaction. The moisture content of the starch (Mc) is also analyzed according to Standard ISO 1666:1996 at the end of the reaction.

Tests 1 to 14 are carried out by performing one pass through the turbodryer, regulated at the temperature T, and the modified starch is recovered after said pass. The duration of the step of modifying the starch is approximately 4 minutes. These tests 1 to 14 are brought together in Table 1.

Tests 15 to 22 are carried out by performing a first pass of the starch through the turbodryer at the temperature T1 and then a second pass at the temperature T2. The duration of the process of modifying the starch is approximately 8 minutes. These tests 15 to 22 are brought together in Table 2.

For the various tests, the solubility of the modified starch and also its weight-average molecular weight, its number-average molecular weight and the polydispersity index ($M_w/M_n$) are given in Tables 1 and 2.

For reasons of readability, the letter "I" appears in the test type column of the table for the modified starches useful in the invention, whereas "CP" is shown in the same column when different modified starches are concerned.

The mass fractions of the starch molecules constituting the modified starches are also measured for some of these starches.

These mass fractions were analyzed for the modified starches obtained in Examples 2, 14, 15, 16, 21 and 22, and also for the product C* ICOAT 07520, sold by Cargill, which exhibits a weight-average molecular weight of 230 000 Da and a solubility of 67%.

The various tests show that the process of the invention, which uses specific conditions during the modifying step, makes it possible to obtain modified starches combining properties hitherto incompatible: a high solubility and a very high weight-average molecular weight.

TABLE 1

Manufacture of modified starches with one pass through the turbodryer

| Test type | Ex. | Conditions for preparing the starch mixture | | Conditions of the modifying process | | Characteristics of the modified starch obtained | | | |
|---|---|---|---|---|---|---|---|---|---|
| | | Acid | n (mol/kg) | % water | T (°C.) | Mc (%) | Solubility (%) | $M_w$ (Da) | $M_n$ (Da) | $M_w/M_n$ |
| CP | 1 | HCl | 0.011 | 22.5 | 140 | 7.4 | 2.8 | 422 112 | Not calculated | Not calculated |
| I | 2 | HCl | 0.011 | 14 | 180 | 2.6 | 70.3 | 660 312 | 30 023 | 22.0 |
| I | 3 | HCl | 0.011 | 14 | 200 | 1.8 | 81.1 | 480 214 | 18 131 | 26.5 |
| CP | 4 | HCl | 0.011 | 14 | 220 | 1.4 | 91.3 | 219 851 | 13 005 | 16.9 |
| I | 5 | HCl | 0.011 | 16 | 200 | 1.7 | 80.5 | 440 245 | 20 120 | 21.9 |
| CP | 6 | HCl | 0.009 | 22.5 | 140 | 5.3 | 65.5 | 169 250 | 25 830 | 6.6 |
| I | 7 | HCl | 0.009 | 22.5 | 200 | 2.1 | 56.5 | 664 321 | 27 412 | 24.2 |
| I | 8 | HCl | 0.009 | 16 | 180 | 2.6 | 57 | 1 204 325 | 54 398 | 22.1 |
| I | 9 | HCl | 0.009 | 16 | 200 | 1.9 | 71 | 900 450 | 35 035 | 25.7 |
| CP | 10 | HCl | 0.009 | 16 | 220 | 1.8 | 86 | 480 217 | 21 872 | 22.0 |
| I | 11 | HCl | 0.009 | 14 | 180 | 3 | 51 | 1 200 138 | 48 231 | 24.9 |
| I | 12 | HCl | 0.009 | 14 | 200 | 2.3 | 70 | 702 543 | 27 432 | 25.6 |
| CP | 13 | HCl | 0.009 | 14 | 220 | 1.9 | 87.5 | 289 342 | 16 350 | 17.7 |
| I | 14 | $H_2SO_4$ | 0.011 | 22.5 | 200 | 2.4 | 60.4 | 1 204 069 | 64 397 | 18.7 |

TABLE 2

Manufacture of modified starches with two passes through the turbodryer

| | | Conditions for preparing the starch mixture | | Conditions for modifying the starch | | | Characteristics of the modified starch obtained | | | |
|---|---|---|---|---|---|---|---|---|---|---|
| Test type | Ex. | Acid | n (mol/kg) | % water | T1 (° C.) | T2 (° C.) | Mc (%) | Solubility (%) | $M_w$ (Da) | $M_n$ (Da) | $M_w/M_n$ |
| I | 15 | HCl | 0.011 | 22.5 | 200 | 140 | 1.8 | 62.8 | 398 326 | Not calculated | Not calculated |
| CP | 16 | HCl | 0.022 | 16 | 200 | 140 | 1.7 | 90 | 25 523 | 5987 | 4.3 |
| CP | 17 | HCl | 0.022 | 16 | 170 | 180 | 1.4 | 98 | 24 123 | Not calculated | Not calculated |
| CP | 18 | HCl | 0.011 | 22.5 | 140 | 140 | 3.7 | 8.3 | 1 100 421 | Not calculated | Not calculated |
| I | 19 | HCl | 0.011 | 22.5 | 140 | 200 | 2.8 | 61.9 | 422 478 | 20 365 | 20.7 |
| I | 20 | HCl | 0.011 | 22.5 | 200 | 200 | 1.6 | 80.1 | 326 185 | 18 238 | 17.9 |
| CP | 21 | HCl | 0.011 | 16 | 140 | 140 | 3 | 65.3 | 96 580 | 19 857 | 9.9 |
| I | 22 | $CH_4O_3S$ | 0.011 | 22.5 | 200 | 200 | 2 | 62.5 | 983 247 | 46 237 | 21.3 |

TABLE 3

Mass fractions of starch molecules in the modified starch of the invention

| Fractions | Ex. 2 | Ex. 14 | Ex. 15 | Ex. 16 | Ex. 21 | Ex. 22 | C* 07520 |
|---|---|---|---|---|---|---|---|
| M ≥ 1 000 000 | 8.5 | 18.4 | 6.2 | 0 | 14.6 | 0.9 | 3.5 |
| 10e6 > M ≥ 10e5 | 36.9 | 43 | 31.9 | 2.1 | 40.7 | 25.1 | 45.7 |
| 10e5 > M ≥ 10e4 | 44.9 | 36.7 | 44.1 | 70.6 | 39.8 | 59.7 | 45.1 |
| 10e4 > M | 9.6 | 1.9 | 17.8 | 27.3 | 4.9 | 14.4 | 5.8 |

Applicative Examples

In order to illustrate the invention, the modified starch will now be used in the manufacture of coating colours in the examples which follow.
Products Used
The following products were used to produce the coating colours:
Styrene-butadiene latex
Pigment 1: Calcium carbonate dispersion
Pigment 2: Kaolin dispersion
Synthetic thickener
Optical brightener
Water
Aqueous sodium hydroxide solution at a concentration of 10 mol·l$^{-1}$
The modified starches used in the coating colours are as follows:
Modified starches of the invention: starch of Ex. 2, 7, 14, 15 and 22.
Comparative starches: C*ICOAT 07520, starch of Ex. 16 and 21.
Preparation of the Colour
The reference colour (Ref.), free of modified starch, comprises 10 parts of latex. To prepare this colour, the pigment dispersions are stirred in a stainless steel vessel using a Raineri motorized deflocculator. The latex is introduced into the vessel after stirring for 10 minutes. After 30 minutes, the other constituents, i.e. the thickener, the optical brightener, the water and the aqueous sodium hydroxide solution, are also successively introduced into the vessel, each of these constituents being added 5 minutes after the preceding one. The amount of sodium hydroxide is adjusted in order to obtain a pH of the colour of 9.

The Brookfield and Hercules viscosities of the colour obtained are subsequently measured according to the methods described above.
The colours according to the invention (I) and the comparative colours (CP) differ from the reference composition in that 4 parts of latex are replaced by 7 parts of modified starch.
These colours are prepared in the same way as the reference colour, except that the modified starch is introduced ten minutes after introducing the latex and that the other constituents are introduced twenty minutes after introducing the modified starch.
The compositions of the colours are shown in Table 4 below.
Preparation of the Papers
The coatings were carried out on a base paper, with a grammage of 80 g/m$^2$, using the Helicoater pilot plant, manufactured by Dixon, with a deposition of colour of 7 to 8 g/m$^2$, the speed of the machine being adjusted to the rheology of the colour. Infrared drying is carried out using 14 lamps, each of 2000 W, and the drying time is 30 seconds.
The papers were calendered in two passes at 60-65° C. with a pressure of 150 daN/cm on a sheet-to-sheet calender from the manufacturer ABK.
Characteristics of the Papers Obtained
The gloss of the papers obtained after calendering was measured according to Standard TAPPI T 480.
The dry pick measurements were determined using an IGT AIC 2-5 device equipped with 50 mm rolls covered with a blanket, using an IGT 3803 ink, on paper test specimens with a size of 340×55 mm.
The ink is deposited on the rolls before transfer onto the paper. Transfer is carried out by applying a pressure of 625 N to the roll, the speed of the sample holder constantly accelerating and reaching a final speed of 4 m/s at the end of the sample.

The wet pick is measured according to the same protocol, apart from the difference that the speed of the sample holder is constant at 0.2 m/s and that transfer of water is carried out before transfer of the ink. This transfer is carried out using a first 38 mm screened roll and by applying a pressure of 400 N to this roll.

The characteristics of the coating colours produced and of the papers obtained from these colours are described in detail in the table below.

TABLE 4

Applicative results

| Test type | Starch No. | Brookfield (mPa·s) | Hercules (mPa·s) | Maximum speed (m/min) | Dry IGT (m/s) | Wet IGT (m/s) | Gloss (%) |
|---|---|---|---|---|---|---|---|
| Ref. | No starch | 500 | 35 | 1300 | 2.18 | 93 | 60.7 |
| I | 2 | 640 | 44 | 1100 | 2.36 | 86.7 | 59.1 |
| I | 7 | 750 | 51 | 1100 | 2.18 | 90.5 | 60.8 |
| I | 14 | 600 | 51 | 1200 | 2.18 | 93.1 | 59.9 |
| I | 15 | 700 | 53 | 1200 | 2.36 | 92.2 | 60.9 |
| CP | 16 | 730 | 46 | 1300 | 2.36 | 71.2 | 58.1 |
| CP | 21 | 830 | 51 | 1200 | 2.18 | 67.5 | 58.4 |
| I | 22 | 690 | 53.5 | 1100 | 2.36 | 91 | 59.8 |
| CP | C*ICOAT 07520 | 980 | 56 | 1100 | 2.54 | 81.9 | 57.2 |

The tests have shown that the modified starches according to the invention 2, 7, 14, 15 and 22 make it possible to obtain coating colours which can be applied at a speed close to that of the starch-free reference coating colour. Some of these colours can even be applied at the same speed as this reference colour. This is also shown by the Brookfield viscosity of the coating colours according to the invention, which, without being as low as the viscosity of the reference colour, is lower in comparison with the viscosity of the comparative colours.

The gloss of the coated paper according to the invention is also greater than that of the comparative coated papers.

The dry pick resistance is similar, whatever the paper. However, the wet pick resistance is greatly improved since it reaches a level close to, indeed even identical to, that of the reference coated paper. This is particularly true if the papers obtained from the compositions of the invention are compared with those obtained from compositions 16 and 21, which are in accordance with the teaching of the document EP 1 964 969 A1.

The invention claimed is:

1. A coating colour comprising water, at least one pigment and at least one dextrin, wherein the water content of the coating colour is less than 60% by total weight of the coating colour and the pigment content is greater than 50% by weight of the solids content of the coating colour, wherein the at least one dextrin has a weight-average molecular weight ranging from 250,000 to 1,400,000 Da and a solubility, measured according to a test A, ranging from 50 to 85%, and
wherein the at least one dextrin is obtained by a process which comprises:
a step of introducing at least one granular starch into a reactor;
a step of introducing, into said reactor, at least one acidic agent, said at least one agent being a strong acid;
a step of modifying the starch in said reactor;
a step of recovering the starch modified in said reactor;
wherein at least part of the modifying step is carried out with:
a moisture content of the starch of between 1 and 3%;
an amount of acid introduced of between 0.003 and 0.020 mol of acid per kg of dry starch; and
a temperature of the reactor of between 160 and 215° C.

2. The coating colour according to claim 1, wherein the polydispersity index of the dextrin is greater than 5.

3. The coating colour according to claim 1, wherein the dextrin exhibits a solubility according to the test A ranging from 55 to 65%.

4. The coating colour according to claim 1, wherein the dextrin exhibits a mass fraction of greater than 5% of dextrin molecules with a molecular weight of greater than 1,000,000 Da.

5. The coating colour according to claim 1, wherein the dextrin comprises, with respect to its total weight:
a mass fraction of between 5 and 25% of dextrin molecules with a molecular weight of greater than 1,000,000 Da,
a mass fraction of between 25 and 50% of dextrin molecules with a molecular weight of greater than 100,000 Da and less than or equal to 1,000,000 Da,
a mass fraction of between 30 and 50% of dextrin molecules with a molecular weight of greater than 10,000 Da and less than or equal to 100,000 Da,
a mass fraction of less than 20% of dextrin molecules with a molecular weight of less than or equal to 10,000 Da.

6. The coating colour according to claim 1, further comprising an additional polymer conventionally used as binder in coating colours, said polymer being selected from the group consisting of styrene polymers, polymers of (meth)acrylic or of (meth)acrylate, saponified or nonsaponified polyvinyl acetates, protein binders, and mixtures thereof.

7. The coating colour according to claim 1, wherein the coating colour comprises, per 100 parts of pigments, from 1 to 25 parts of dextrin and from 0 to 10 parts of additional polymer, the sum of the parts of dextrin and additional polymer ranging from 4 to 30.

8. The coating colour according to claim 7, wherein the coating colour comprises, per 100 parts of pigments, from 2 to 15 parts of dextrin and from 2 to 7 parts of additional polymer, the sum of the parts of dextrin and additional polymer ranging from 6 to 25 parts.

9. The coating colour according to claim 1, wherein the coating colour exhibits a pH ranging from 8 to 10.5.

10. The coating colour according to claim 1, the solids content of which is between 40 and 85%.

11. The coating colour according to claim 1, wherein the coating colour exhibits a Brookfield viscosity ranging from 500 to 2000 mPa·s and/or a Hercules viscosity ranging from 40 to 80 MPa·s.

12. A process for preparing a coating colour according to claim 1, comprising:
   a step of mixing the water, the pigment, the dextrin and the optional additional polymer;
   a step of recovering the coating colour;
wherein the mixing step is carried out at a temperature ranging from 5 to 50° C.

13. The process for coating paper, further comprising at least one step of coating a paper with the coating colour according to claim 1.

14. A coated paper obtained from the process according to claim 13.

15. The coated paper according to claim 14, wherein the coated paper comprises from 1 to 5 layers, at least one of said layers being obtained from the coating colour.

16. A process for printing a coated paper according to claim 14, comprising printing is that of offset, heliogravure, rotogravure, lithogravure, ink jet or flexography type.

\* \* \* \* \*

UNITED STATES PATENT AND TRADEMARK OFFICE
CERTIFICATE OF CORRECTION

PATENT NO. : 10,323,158 B2
APPLICATION NO. : 14/358737
DATED : June 18, 2019
INVENTOR(S) : Julien Mesnager et al.

It is certified that error appears in the above-identified patent and that said Letters Patent is hereby corrected as shown below:

On the Title Page

Item (73) "Roquettes Freres" should be replaced with "Roquette Freres".

Signed and Sealed this
Seventeenth Day of March, 2020

Andrei Iancu
*Director of the United States Patent and Trademark Office*